US006731576B2

(12) United States Patent
Hattori

(10) Patent No.: US 6,731,576 B2
(45) Date of Patent: May 4, 2004

(54) OPTICAL DISK RECORDING APPARATUS IN WHICH DATA RECORDING ON THE DISK IS SUSPENDED WHEN STORED DATA TO BE RECORDED FALLS BELOW A PREDETERMINED AMOUNT AND IN WHICH THE NUMBER OF SUSPENSIONS IS COUNTED

(75) Inventor: Katsuki Hattori, Kiryu (JP)

(73) Assignee: Sanyo Electric Co., Ltd., Osaka (JP)

( * ) Notice: Subject to any disclaimer, the term of this patent is extended or adjusted under 35 U.S.C. 154(b) by 486 days.

(21) Appl. No.: 09/878,964

(22) Filed: Jun. 11, 2001

(65) Prior Publication Data

US 2002/0003759 A1 Jan. 10, 2002

(30) Foreign Application Priority Data

Jul. 10, 2000 (JP) ........................................ 2000-208533

(51) Int. Cl.[7] ................................................. G11B 5/09
(52) U.S. Cl. .................. 369/47.33; 369/53.12
(58) Field of Search ........................... 369/30.23, 47.32, 369/47.33, 47.34, 53.12, 53.13, 53.42, 53.37

(56) References Cited

U.S. PATENT DOCUMENTS 6,538,962 B2 * 3/2003 Hyun ....................... 369/30.23
6,570,832 B2 * 5/2003 Yamamoto ............... 369/59.25

* cited by examiner

Primary Examiner—Paul W. Huber
(74) Attorney, Agent, or Firm—Hogan & Hartson, LLP

(57) ABSTRACT

To provide an optical disk recording apparatus capable of signal recording onto a disk using a laser emitted from an optical pick-up. Signals temporarily stored in the buffer RAM (10) are read, and recorded onto a disk (1). When the amount of signal data in the buffer RAM (10) decreases below a predetermined amount as signals are read therefrom while the read signals are recorded onto the disk (1), the signal recording onto the disk (1) is suspended. When the amount of signal data in the buffer RAM (10) increases to the predetermined amount, the signal recording onto the disk (1) is resumed. The number of occurrences of signal recording suspension and resumption due to the shortage of signals in the buffer RAM (10) is counted.

2 Claims, 1 Drawing Sheet

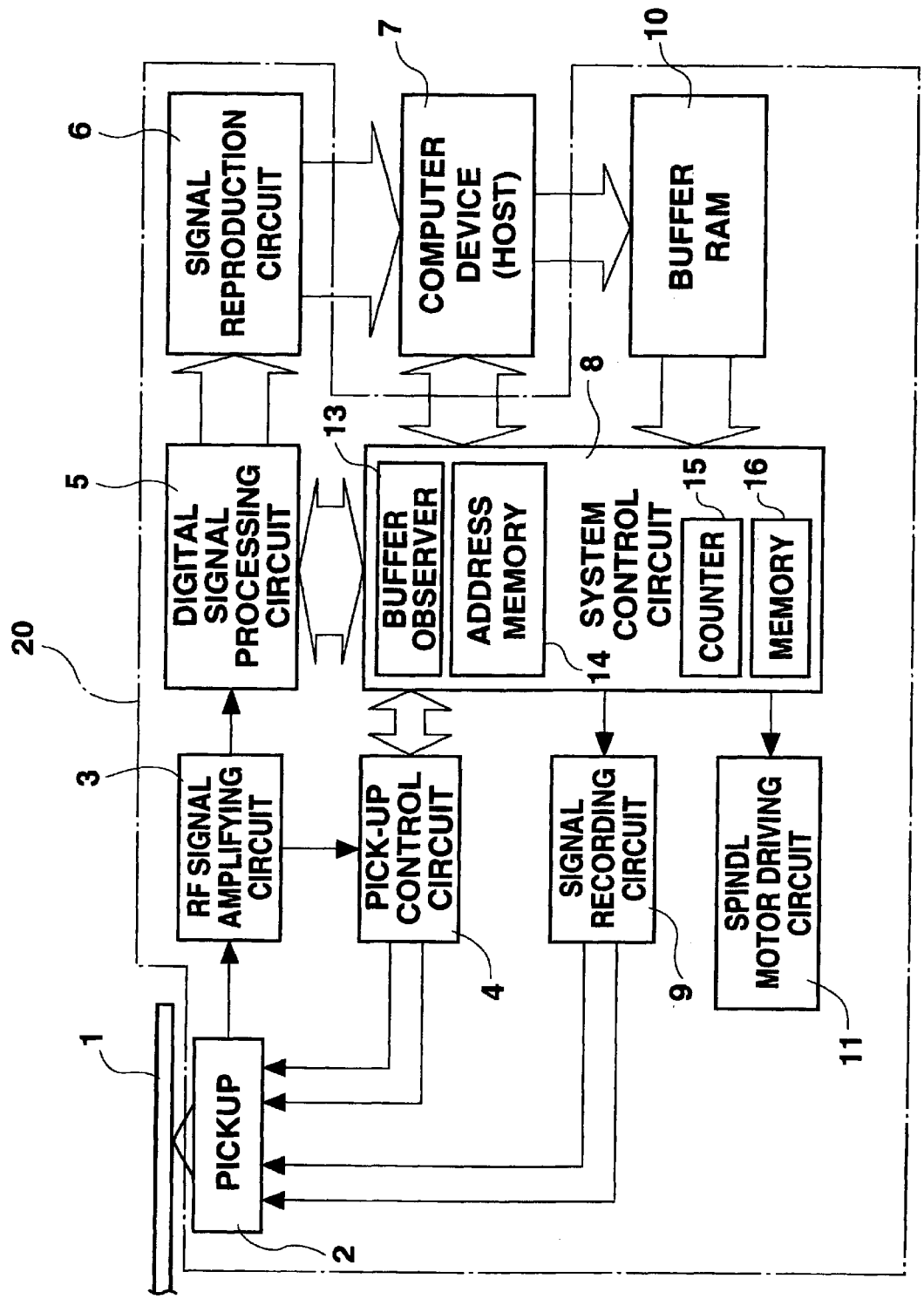

OPTICAL DISK RECORDING APPARATUS IN WHICH DATA RECORDING ON THE DISK IS SUSPENDED WHEN STORED DATA TO BE RECORDED FALLS BELOW A PREDETERMINED AMOUNT AND IN WHICH THE NUMBER OF SUSPENSIONS IS COUNTED

BACKGROUND OF THE INVENTION

1. Field of the Invention

The present invention relates to an optical disk recording apparatus for recording a signal onto a disk using a laser from an optical pick-up, and reproducing a signal recorded on the disk using a laser.

2. Description of the Related Art

Disk players capable of signal reading from a disk using an optical pick-up are popular. In particular, optical disk recording and reproduction apparatuses capable of, in addition to signal reproduction, signal recording onto a disk using a laser emitted from an optical pick-up have recently been introduced into the consumer market. Moreover, optical disk recording and reproduction apparatus capable of signal recording onto a disk under rotation control at a high constant linear velocity (CLV) twice, four, six, eight, ten, or even twelve times a standard linear velocity, have been developed.

Optical disk recording and reproduction apparatuses are constructed adapted to signal recording in response to a record command from a host computer. Specifically, in a recording operation, signals to be recorded onto a disk, or recording signals, are temporarily stored in a buffer RAM, and read therefrom to be recorded onto the disk.

In a normal signal recording operation, signal writing from a computer device into a buffer RAM, signal reading from the buffer RAM, and signal recording onto a disk are all carried out in accordance with the amount of recording signal data and signal recording condition. When the signal writing speed at which to write signals onto the buffer RAM becomes slower compared with the signal recording speed at which they are recorded onto a disk under the above described signal recording condition, recording signals in the buffer RAM may run short, leading to suspension or discontinuation of signal recording onto the disk. This phenomenon, generally referred to as buffer under-run, is more likely to occur when higher disk rotation speeds are employed in signal recording onto a disk.

In order to address this problem, techniques are suggested including one in which signal recording onto the disk is suspended when buffer under-run occurs, although signals are continuously written into the buffer RAM during the suspension, and the suspended signal recording is resumed when a predetermined amount of signal data has been stored in the buffer RAM.

Resumption of once suspended signal recording may comprise setting a signal recording resumption point at a point at which the signal recording was suspended, and controlling the signal recording such that a signal after the resumption is recorded onto the disk so as to continue from the signal recorded onto the disk just before the suspension.

As described above, conventionally, signal recording onto a disk is suspended when the amount of signal data stored in the buffer RAM has been reduced below a predetermined amount, and resumed when it has been increased to a predetermine amount. This, however, has a problem such that, when the optical disk recording and reproduction apparatus completes signal recording as instructed by a host device, the host device has no means of ascertaining whether or not the signal recording just completed has ever been suspended and resumed during the process.

SUMMARY OF THE INVENTION

The present invention has been conceived to overcome the above problem and aims to provide an optical disk recording apparatus capable of solving this problem.

According to a first aspect of the present invention, there is provided an optical disk recording apparatus, comprising a control circuit for controlling data recording onto a disk so as to suspend upon detection of data shortage in a buffer memory, and resume upon detection of the fact that a sufficient amount of data has been stored in the buffer memory; and a counter for counting the number of occurrences of suspension of data recording onto the disk (which is basically equal to that of resumption of data recording onto the disk) as a result of control by the control circuit.

According to a second aspect of the present invention, the optical disk recording apparatus may have an output section for notifying an external computer device of the fact that signal recording onto the disk is suspended and resumed under control of the control circuit.

According to a third aspect of the present invention, the optical disk recording apparatus may comprise a location circuit for locating a point on the disk at which the signal recording was suspended and resumed under control of the control circuit.

BRIEF DESCRIPTION OF THE DRAWINGS

The above and other objects, features, and advantages of the present invention will become further apparent from the following description of the preferred embodiment taken in conjunction with the accompanying drawing which is a block circuit diagram showing an example of an optical disk recording and reproduction apparatus according to the present invention.

DESCRIPTION OF THE PREFERRED EMBODIMENTS

The attached drawing is a block diagram showing a circuit of an optical signal recording and reproduction apparatus in a Preferred embodiment of the present invention. In the drawing, a disk 1, which serves as a recording medium, is placed on a turntable, not shown, of a signal recording and reproduction apparatus 20. The turntable is driven to rotate by a spindle motor, not shown. Position information data is recorded in a wobble groove formed on the disk 1. A wobble signal is read from the groove, and used in signal recording and reproducing operation. An optical pick-up 2 comprises a laser diode for emitting an optical beam to the disk 1, a monitor diode for monitoring the optical beam emitted from the laser diode, and an optical detector for receiving an optical beam reflected on the signal surface of the disk 1. The pick-up 2 is moved in the radial direction of the disk 1 by a pick-up feed motor, not shown.

An RF signal amplifying circuit 3 conducts amplification and wave-shaping with respect to an RF signal supplied from an optical detector incorporated into the optical pick-up 2. A pick-up control circuit 4 controls focusing and tracking based on a signal from the RF signal amplifying circuit 3. In actuality, a focus servo circuit and a tracking servo circuit, both incorporated into the optical pick-up 2, carry out focusing control and tracking control, respectively. Focus control is for making an optical beam from the optical pick-up 2 focused on the signal surface of the disk 1, while tracking control is for making the optical beam tracking over the signal track on the surface.

A digital signal processing circuit 5 digitally processes a signal from the RF signal amplifying circuit 3, and demodulates a variety of signals. A signal reproduction circuit 6 receives a digital signal from the digital signal processing circuit 5, and converts the digital signal into an analog signal before outputting to an amplifier and so on, when information recorded on the disk 1 is audio signal information. When information recorded on the disk 1 is data signal information, such as computer software, on the other hand, the signal reproduction circuit 6 forwards the digital signal to a host or computer device 7.

A system control circuit 8 receives a demodulated signal from the digital signal processing circuit 5, and conducts a variety of control operations in response to a command signal from the computer device 7. A signal recording circuit 9 receives a recording signal, including test signal, information signal, and so on, and controls laser emission from a laser driving circuit, not shown, for signal recording onto the disk 1 in accordance with the received signal.

A buffer RAM 10 temporarily stores a recording signal, or a signal to be recorded onto the disk 1. Specifically, signals from the computer device 7 are stored in the buffer RAM 10. Such signal storage and reading with respect to the buffer RAM 10 is carried out under control of the system control circuit 8. A spindle motor drive circuit 11 drives a spindle motor, which in turn drives a disk 1 to rotate, under control of the system control circuit 8. With such rotation control, a disk can rotate not only at a standard linear velocity, but also at a high constant linear velocity twice, four, six, eight, ten, or even twelve times the standard velocity.

With the above arrangement, in a signal recording operation onto the disk 1, the computer device 7 supplies signals to the buffer RAM 10, which are then stored therein and read therefrom for being recorded onto the disk 1. The system control circuit 8 controls signal reading from the buffer RAM 10 to thereby signal recording onto the disk 1. Specifically, the system control circuit 8 suspends signal recording onto the disk 1 when the amount of signal data in the buffer RAM 10 has been reduced below a first predetermined amount, and then resumes when it has been increased to a second predetermined amount due to the action of the computer device 7 continuously writing signals into the buffer RAM 10. Note that the amount of data (signals) in the buffer RAM 10 is observed by a buffer observer 13.

In resumption of once suspended signal recording onto the disk 1, the system control circuit 8 compares a signal stored in the buffer RAM 10 and that last recorded onto the disk 1 prior to the signal recording discontinuation or suspension, and controls recording of a signal after the resumption so as to continue from the signal last recorded onto the disk 1 before the resumption, in other words, in a "seamless method". Should signal recording not be resumed even after the lapse of a predetermined amount of time, the computer device 7 terminates the signal recording.

An optical disk recording and reproduction apparatus of the present invention has a structure described above. In the following, a signal reproduction operation conducted by the thus structured optical signal recording and reproduction apparatus will be described.

The system control circuit 8 of a drive device, responsive to a reproduction command from the computer device 7, initiates control for signal reproduction. In signal reproduction, a laser driver circuit feeds driving current to a laser diode in the optical pick-up 2 so that a laser output for use in signal reading can be produced.

Along with the control for signal reproduction, the spindle motor drive circuit 11 begins driving rotation of the spindle motor. This rotation control is applied such that the spindle motor drives the disk 1 to rotate at a constant linear velocity, through comparison between a synchronous signal obtained by decoding a wobble signal and a reference signal output from a reference signal generation circuit, not shown. This control is similarly applied in signal recording, described later.

While the spindle motor is driven to rotate as described above, the optical pick-up control circuit 4 initiates focusing control and tracking control so that the optical pick-up 2 starts signal reading from the disk 1 for reproduction. However, prior to the start of signal reproduction, TOC data is read from a read-in area, which constitutes an initial session on the disk 1. The TOC data recorded in the read-in area and thus read, is used in signal reading from a signal recording area at the initial session on the disk 1, and reproduction of the signals.

A signal read by the optical pick-up 2 is supplied to the RF signal amplifying circuit 3, where the signal is subjected to amplification and wave-shaping. The resultant signal is supplied to the digital signal processing circuit 5 for demodulation. Specifically, in demodulation, information data is extracted from the signal, and subjected to signal processing, such as error correction. The resultant signal is supplied to the signal reproduction circuit 6.

For information data in the form of an audio signal, read from the disk 1, the signal reproduction circuit 6 converts the information data into an analog signal, and outputs the resultant analog signal to an amplifier or the like. For information data in the form of a data signal, for example, a computer software, the signal reproduction circuit 6 forwards the information data to the computer device 7.

While signals read from the disk 1 are reproduced in the present invention as described above, signals are recorded onto the disk 1 as described below.

In signal recording onto the disk 1, initial setting is applied. Specifically, a test signal is initially recorded onto a test area on the disk 1, and then read therefrom so that the read recording result is reproduced. This process makes it possible to obtain a driving current value suitable to produce an optimum laser output for signal recording. The obtained current value is provided to the laser diode. After this initial setting, information data stored in a "buffer" area on the disk 1, which is information concerning locations of signals stored in a signal recording area on the disk 1, is read.

Then, whether or not recording of a data signal onto a signal recording area on the disk 1 is possible is determined based on the read information data. If determined to be possible, settings such as the point on the disk at which signal recording should be started are also determined.

When this determination is completed, the optical pick-up 2 is advanced to a point on the disk 1 at which to start signal recording onto the disk 1. Simultaneously, the writing of signals into the buffer RAM 10 is begun, so that the amount of signal data in the buffer RAM 10 gradually increases. When the amount of signal data in the buffer RAM 10 exceeds a predetermined amount, the system control circuit 8 begins reading signals reading from the buffer RAM 10 for supply to the signal recording circuit 9. Accordingly, the signal recording circuit 9 begins controlling the laser driving circuit, and the signals are actually recorded onto the disk 1.

Signal recording onto the disk 1 is carried out according to the present invention as described above. Meanwhile, signal writing into the buffer RAM 10 is carried out normally in accordance with the signal reading therefrom. Specifically, in signal writing into the buffer RAM 10, a signal may be written into a part in the buffer RAM 10, from which another signal has been read. This process is repeatedly performed.

When the speed of signal recording onto the disk 1 is greater than that of signal writing onto the buffer RAM 10, the amount of signal data in the buffer RAM 10 gradually decreases until it comes to an amount disabling the signal recording onto the disk 1. This is referred to as buffer under-run. Then, the system control circuit 8 controls so as to suspend signal recording onto the disk 1 when the amount of data in the buffer RAM 10 has been reduced below a predetermined amount. Thereafter, as the computer device 7 continuously supplies signals to the buffer RAM 10 while signal recording onto the disk 1 remains suspended, the amount of signal data in the buffer RAM 10 gradually increases.

When the amount of signal data in the buffer RAM 10 has increased to a second predetermined amount, the system control circuit 8 performs control to resume signal recording onto the disk 1. Specifically, the optical pick-up 2 is brought to a point on the disk 1 just before the point at which to resume signal recording, or a point at which signal recording was discontinued or suspended, and begins reading a signal from the just prior point for reproduction.

The thus reproduced signal is the signal last recorded onto the disk 1 before the signal recording suspension, namely the last recorded signal. The system control circuit 8 compares the last recorded signal reproduced and a signal stored in the buffer RAM 10. When these signals are the same, a signal stored in the buffer RAM 10 so as to continue from the signal subjected to the comparison and identified as the same, is read, and input to the signal recording circuit 9. Thereafter, signal recording onto the disk 1 is resumed.

Signal recording onto the disk 1 is suspended and resumed as described above, so that signals can be continuously, or "seamlessly", recorded onto the disk even though the recording process was once suspended.

The above described control is applied when signals from the computer device 7 run short, in other words, when signal recording onto the disk 1 is suspended and resumed. In addition to this control, the system control circuit 8 conducts characteristic control described below.

That is, the system control circuit 8 counts the number of occurrences of suspension/resumption of signal recording every occurrence using a counter circuit 15 incorporated thereinto. The counted number is stored in a memory circuit 16.

That is, the number of occurrences of signal recording suspension/resumption is counted throughout the entire signal recording process, and stored in the memory circuit 16. When the recording operation is completed, the system control circuit 8 informs the computer device 7 of the count. The computer device 7 displays the count on a display device, thereby reporting to the user the number of occurrences of buffer under-run during a process of concerned signal recording onto the disk 1. A user aware of such a number can ascertain the performance level of the computer device 7, and can moreover, judge whether or not the signal recording speed should be reduced (for example, from eight to four times a standard velocity).

In the above example, the number of occurrences of signal recording suspension/resumption during a signal recording process is counted. Alternatively, or additionally, information data on a point on the disk 1 at which signal recording was suspended and resumed, or location information data, may be stored in the memory circuit 16, and, when the recording operation is completed, the location information data may be supplied to the computer device 7. The computer device 7, after receiving the data, displays the location information on the display device, so that the user can understand the location on the disk 1 at which buffer under-run occurred during the process of signal recording to the disk 1. This is convenient for the user to ascertain recording characteristics and/or continuity of a recording signal, and so on, of that particular point on the disk at which signal recording was suspended.

In the above process, a point at which signal recording was suspended and resumed can be determined with reference to the address information stored in an address memory 14 provided to the system control circuit 8 because the system control circuit 8 sequentially stores address information, such as Absolute Time in Pre-groove (ATIP) address and a sub-code address, indicative of an address where data was last recorded, or the latest recording address, in the address memory 14. That is, should signal recording be suspended, the latest address value stored in the address memory 14 indicates a point where that signal recording was suspended (which is equal to a recording resumption point). Therefore, the system control circuit 8 may retrieve the latest recording address from the address memory 14 and store the address in the memory circuit 16, at predetermined timing during a period from suspension to resumption of the signal recording.

In the embodiment, the number of occurrences of signal recording suspension and resumption and the location information data indicative of a point on the disk 1 at which signal recording was suspended during concerned signal recording, are supplied to the computer device 7 when the signal recording is completed. Alternatively, a signal indicative of occurrence of the suspension/resumption and/or the location data may be supplied to the computer device 7 every time signal recording is suspended or resumed.

What is claimed is:

1. An optical disk recording apparatus for optically recording data supplied from an external apparatus, onto a disk, comprising:

a buffer memory for temporarily storing the data supplied from an external apparatus;

a control circuit for controlling reading of the data from the buffer memory to supply the data to an optical pick-up and causing the pick-up to record the data onto the disk, in which the reading of the data is suspended when an amount of data stored in the buffer memory is reduced below a first predetermined amount so as to cause the optical pick-up to suspend data recording onto the disk, and the reading of the data is resumed when the amount of data stored in the buffer memory is increased to a second predetermined amount so as to cause the optical pick-up to resume the data recording onto the disk; and a counter for counting the number of occurrences of suspension and resumption of data recording onto the disk resulting from control of the control circuit.

2. An optical disk recording apparatus according to claim 1, further comprising an output section for outputting information concerning the number of occurrences counted by the counter, to a computer device connected to the optical disk recording apparatus.

* * * * *